US009596973B2

(12) United States Patent
Lee et al.

(10) Patent No.: US 9,596,973 B2
(45) Date of Patent: Mar. 21, 2017

(54) AUXILIARY GRAY WATER SOURCE DEVICE FOR COMMERCIAL KITCHENS

(71) Applicant: Seven Hour Drive, LLC, Irvine, CA (US)

(72) Inventors: Eduardo Yong Lee, Irvine, CA (US); Daniel John Dickinson, Laguna Niguel, CA (US)

(73) Assignee: Seven Hour Drive, LLC, Irvine, CA (US)

( * ) Notice: Subject to any disclaimer, the term of this patent is extended or adjusted under 35 U.S.C. 154(b) by 0 days.

(21) Appl. No.: 14/493,808

(22) Filed: Sep. 23, 2014

(65) Prior Publication Data

US 2015/0014228 A1  Jan. 15, 2015

Related U.S. Application Data

(63) Continuation-in-part of application No. 14/211,332, filed on Mar. 14, 2014, which is a continuation-in-part of application No. 13/815,995, filed on Mar. 21, 2013, now abandoned.

(51) Int. Cl.
| *B08B 3/00* | (2006.01) |
|---|---|
| *A47L 15/00* | (2006.01) |
| *C02F 1/00* | (2006.01) |
| *A47L 15/42* | (2006.01) |
| *C02F 103/00* | (2006.01) |

(52) U.S. Cl.
CPC ....... *A47L 15/0076* (2013.01); *A47L 15/4217* (2013.01); *C02F 1/001* (2013.01); *C02F 2103/002* (2013.01); *Y10T 29/49826* (2015.01)

(58) Field of Classification Search
CPC .............................. A47L 15/4291; A47L 15/42

USPC ......... 134/25.2, 56 D, 57 D, 58 D, 109, 110, 134/111, 47; 137/47
See application file for complete search history.

(56) References Cited

U.S. PATENT DOCUMENTS

| 1,833,374 | A | * | 11/1931 | Renshaw | ............... A47L 15/23 |
|---|---|---|---|---|---|
| | | | | | 134/179 |
| 1,980,065 | A | * | 11/1934 | Johnston | ........................... 239/1 |
| 3,108,606 | A | * | 10/1963 | Grunvogel | ................. 134/57 D |
| 3,949,772 | A | | 4/1976 | Hartmann | |
| 4,064,836 | A | | 12/1977 | Taborsky | |
| 4,134,833 | A | | 1/1979 | McCormick | |

(Continued)

FOREIGN PATENT DOCUMENTS

| CA | 2626171 A1 | 9/2009 |
|---|---|---|
| DE | 4330395 A1 | 3/1995 |
| WO | WO 2010/040969 A1 | 4/2010 |

OTHER PUBLICATIONS

Wexiodisk Brochure, The Hood Type Concept; 8 pages.

(Continued)

*Primary Examiner* — Craig Schneider
*Assistant Examiner* — Angelisa L Hicks
(74) *Attorney, Agent, or Firm* — Knobbe, Martens, Olson & Bear, LLP

(57) ABSTRACT

An auxiliary grey water supply device captures used wash water from a commercial warewashing machine for supply to a pre-rinse station without substantial modification of the commercial warewashing machine. The captured wash water is delivered to a pre-rinse station for pre-rinsing of dishes that will be washed within the commercial warewashing machine.

19 Claims, 5 Drawing Sheets

(56) References Cited

U.S. PATENT DOCUMENTS

| | | | |
|---|---|---|---|
| 4,228,813 A | 10/1980 | Noren | |
| 4,317,720 A * | 3/1982 | Hawk | 210/86 |
| 4,439,242 A * | 3/1984 | Hadden | A47L 15/0005 |
| | | | 134/25.2 |
| 4,529,032 A * | 7/1985 | Molitor | 165/301 |
| 4,615,744 A | 10/1986 | Murtha | |
| 4,776,359 A | 10/1988 | Federighi et al. | |
| 5,251,346 A | 10/1993 | Donati | |
| 5,617,885 A * | 4/1997 | Centis | 134/58 D |
| 5,660,193 A * | 8/1997 | Archer et al. | 134/56 D |
| 6,702,942 B1 | 3/2004 | Nield | |
| 7,666,265 B2 * | 2/2010 | Yoon et al. | 134/56 D |
| 7,892,359 B2 | 2/2011 | Berner et al. | |
| 7,954,913 B2 | 6/2011 | Gunnerson et al. | |
| 2002/0170584 A1 * | 11/2002 | Crane | A47L 15/4291 |
| | | | 134/104.4 |
| 2005/0103717 A1 | 5/2005 | Jha et al. | |
| 2007/0034240 A1 * | 2/2007 | Berner et al. | 134/110 |
| 2008/0116135 A1 * | 5/2008 | Rieger et al. | 210/650 |
| 2010/0071725 A1 | 3/2010 | Peukert et al. | |
| 2011/0132407 A1 | 6/2011 | Fauth et al. | |
| 2011/0155179 A1 | 6/2011 | Delle et al. | |
| 2011/0232690 A1 | 9/2011 | Ericsson et al. | |

OTHER PUBLICATIONS

Parker Hannafin, Glass-MateTM Cartridges, 2007, http://www.parker.com/literature/Process%20Advanced%20Filtration%20Division/PAFD_liternature/Single%20sheets/GlassMate%20C2041.pdf; 3 pages.

International Search Report and Written Opionion PCT/US14/31368; dated Sep. 9, 2014; 14 pages.

International Search Report and Written Opinion from related International Patent Application No. PCT/US2015/051551, mailed Dec. 29, 2015, in 7 pages.

Partial Supplementary Search Report in corresponding European Patent Application No. 14769609.0, dated Jul. 7, 2016, in 7 pages.

Wexiodisk, "The Hood Type Concept", 2013, www.wexiodisk.com, in 8 pages.

* cited by examiner

US 9,596,973 B2

AUXILIARY GRAY WATER SOURCE DEVICE FOR COMMERCIAL KITCHENS

CROSS-REFERENCE TO RELATED APPLICATION

This application is a continuation-in-part of U.S. application Ser. No. 14/211,332, filed Mar. 14, 2014, which is a continuation-in-part application of U.S. application Ser. No. 13/815,995, filed Mar. 21, 2013, the entire contents of which is hereby incorporated by reference and should be considered a part of this specification.

FIELD OF THE INVENTION

The present invention generally relates to commercial warewashing facilities. More particularly, the present invention relates to an auxiliary apparatus designed to provide a replenishing gray water source for use by a pre-rinse station prior to a warewashing machine in such facilities.

BACKGROUND OF THE INVENTION

The food service industry needs to manage the high number of soiled dishes encountered on a daily basis. The food service industry includes restaurants and numerous institutional food service establishments present in schools, prisons, municipal buildings, military mess halls, and the like.

In such food service industry establishments, the warewashing process typically begins with scraping of dishes into a garbage can or other refuse container. Scraping is performed to remove the larger scraps of food and the like. Following scraping, pre-rinse sprayers are used to rinse the dishes prior to placement of the dishes into commercial warewashing machines.

The commercial warewashing machine market is different that of most other commercial food service equipment markets. Warewashing machines often are not owned by the individual restaurant or food service operator. Rather, warewashing machines are leased to the individual restaurant or food service operator by a chemical sales company. As a term of many leases, the food establishment is not able to modify, service or repair the warewashing machine. Rather, the food establishment is simply able to use the machine to wash the dishes.

SUMMARY OF THE INVENTION

Commercial warewashing machines come in several different configurations. One of the configurations is a fill-and-dump machine. In such machines, the water is dumped after each wash. One example of such a machine is the ES2000 Dishmachine by EcoLab. In the ES2000 Dishmachine, between one and five gallons of used dishwashing water is dumped into a drain following each wash cycle. This dishwashing water comprises a plurality of soaps and rinsing agents.

One aspect of the present invention involves the recognition that it is desired to save both water and gas/electric while not significantly modifying a warewashing machine. Accordingly, certain features, aspects and advantages of the present invention provide for an auxiliary device that is separate of a commercial warewashing machine but that can capture some or all of the used dishwashing water for use with a pre-rinse station. In some configurations, the auxiliary device can capture the used dishwashing water without substantial modification of the commercial warewashing machine. In some configurations, the auxiliary device can be integrated into a commercial warewashing machine.

Certain features, aspects and advantages of the present invention provide for a method of installing an auxiliary device that is separate of a commercial warewashing machine but that can capture some or all of the used dishwashing water for use with a pre-rinsing station.

In accordance with certain features, aspects and advantages of the present invention, an auxiliary grey water supply device for use in a commercial food service facility is provided. The auxiliary grey water supply device comprises a tank. The tank comprises an inlet. The inlet receives a removable scrap trap. The tank further comprises an overflow outlet and a freshwater supply inlet. The overflow outlet is vertically lower than the freshwater supply inlet. A pump has an inlet in fluid communication with the tank and an outlet in fluid communication with a delivery conduit.

In accordance with certain features, aspects and advantages of the present invention, a method of installing an auxiliary grey water supply device is provided. The method comprising disconnecting a pre-rinse unit from a hot water faucet and a cold water faucet, locating the auxiliary grey water supply device proximate a warewashing station, connecting a delivery conduit to the hot water faucet and the cold water faucet and positioning an inlet of the auxiliary grey water supply device vertically below an outlet from a warewashing machine whereby a tank of the auxiliary grey water supply device captures substantially all of a load of grey water being evacuated from the warewashing machine through the inlet of the auxiliary grey water supply device without significant modification of the warewashing machine.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures:

FIG. 2A is a schematic view of the commercial warewashing station and the auxiliary device;

DETAILED DESCRIPTION OF THE PREFERRED EMBODIMENT

Figure 1:
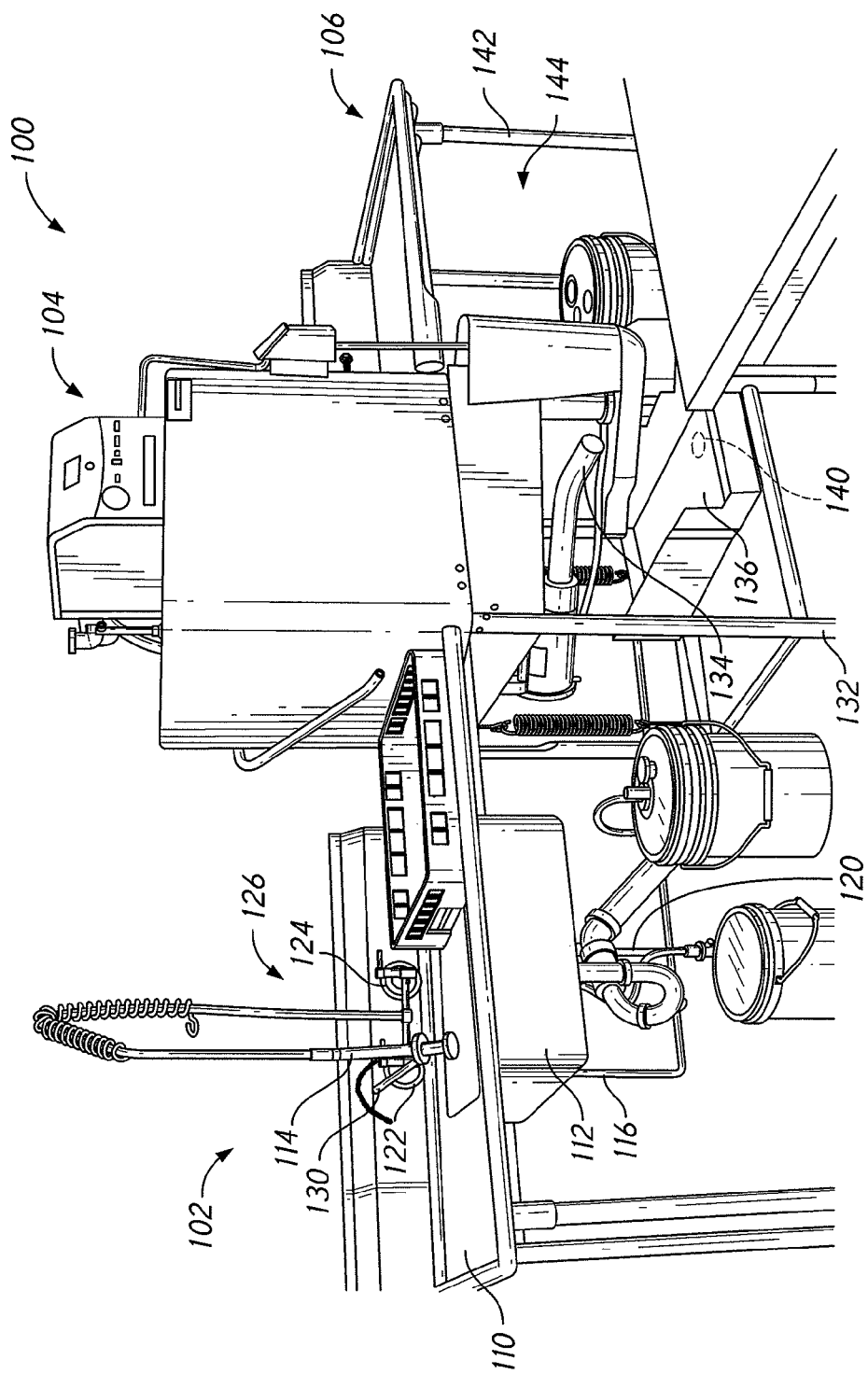
FIG. 1 is a perspective view of a typical commercial warewashing station.

With reference now to FIG. 1, a typical commercial warewashing station 100 will be introduced. The station 100 can include three main regions. The first region can include a pre-rinse station 102. Following the pre-rinse station 102 is a second region that includes a warewashing machine 104. The third region, which is downstream of the first and second regions, can include an air-drying table 106.

In the illustrated configuration, the station 100 is laid out in a straight-through configuration. In some configurations, the station 100 can be L-shaped or U-shaped. In some configurations, the station 100 has a counter depth of 24 inches. These differing configurations can result in variations of certain features, aspects and advantages of the present invention, as will be explained below. In other words, some of the components can be relocated to better facilitate access to those components, such as spigots, faucets, valves and scrap traps, for example but without limitation.

With continued reference to FIG. 1, the pre-rinse station 102 comprises a table 110. A sink 112 can be mounted to the table 110. A pre-rinse unit 114 can be positioned generally above the sink 112. The pre-rinse unit 114 can be connected to one or more of a hot water supply 116 and a cold water supply 120. The hot water supply 116 and the cold water supply 120 can comprise a hot water faucet 122 and a cold water faucet 124. Generally, the pre-rinse unit 114 will comprise an inlet 126 that will be connected to at least one of, and typically both of, the hot water faucet 122 and the cold water faucet 124. The pre-rinse unit 114 also can include a valve 130 to control the flow out of the pre-rinse unit 114. When the valve 130 is actuated, flow from the hot water supply 116 and the cold water supply 120 can pass through the hot water faucet 122 and the cold water faucet 124, through the pre-rinse unit 114 and into the sink 112. In most configurations, the pre-rinse station 102 will use a low flow nozzle or spray head due to various local water-use regulations.

The warewashing machine 104 can have any suitable configuration. In some configurations, the warewashing machine 104 can be a machine, such as the ES2000 by EcoLab. Because certain features, aspects and advantages of the present invention involve providing an auxiliary device to the warewashing machine 104 without significant modification to the warewashing machine 104, many features of the warewashing machine 104 will not be described in detail.

The illustrated warewashing machine 104 is supported by a frame 132. Any suitable support or frame 132 can be used so long as access is available to an outlet 134 from the washing chamber (not shown). In the illustrated configuration, the outlet 134 is positioned generally above a scrap trap 136. The scrap trap 136 can comprise a perforated tray that serves to separate larger food waste and the like from water emitted through the outlet 134. Water that has passed through the scrap trap 136 flows through a drain outlet 140 that can be plumbed to the nearest floor sink or the like. The drain outlet 140 can be connected to the floor sink or the like using a conduit, for example but without limitation.

When the warewashing machine 104 is in use, the warewashing machine 104 is supplied fresh water and pre-rinsed dishes to wash as a batch. Upon completion of a wash cycle, the warewashing machine 104 dumps the used wash water (i.e., the gray water) through the outlet 134, onto the scrap trap 136 and ultimately through the drain outlet 140, which is plumbed to the city sewer system. The amount of gray water disposed can vary depending upon the make and model of the warewashing machine in use. In some configurations, the warewashing machine 104 can emit between one and five gallons per cycle.

The air-drying table 106 can have any suitable configuration. In some configurations, the air-drying table 106 includes a frame 142. The frame 142 can have an open configuration to define an open racking area 144. In some configurations, the frame 142 can be positioned above the floor sink, floor drain or the like.

Auxiliary Device for Capture of Gray Water

Figure 2:
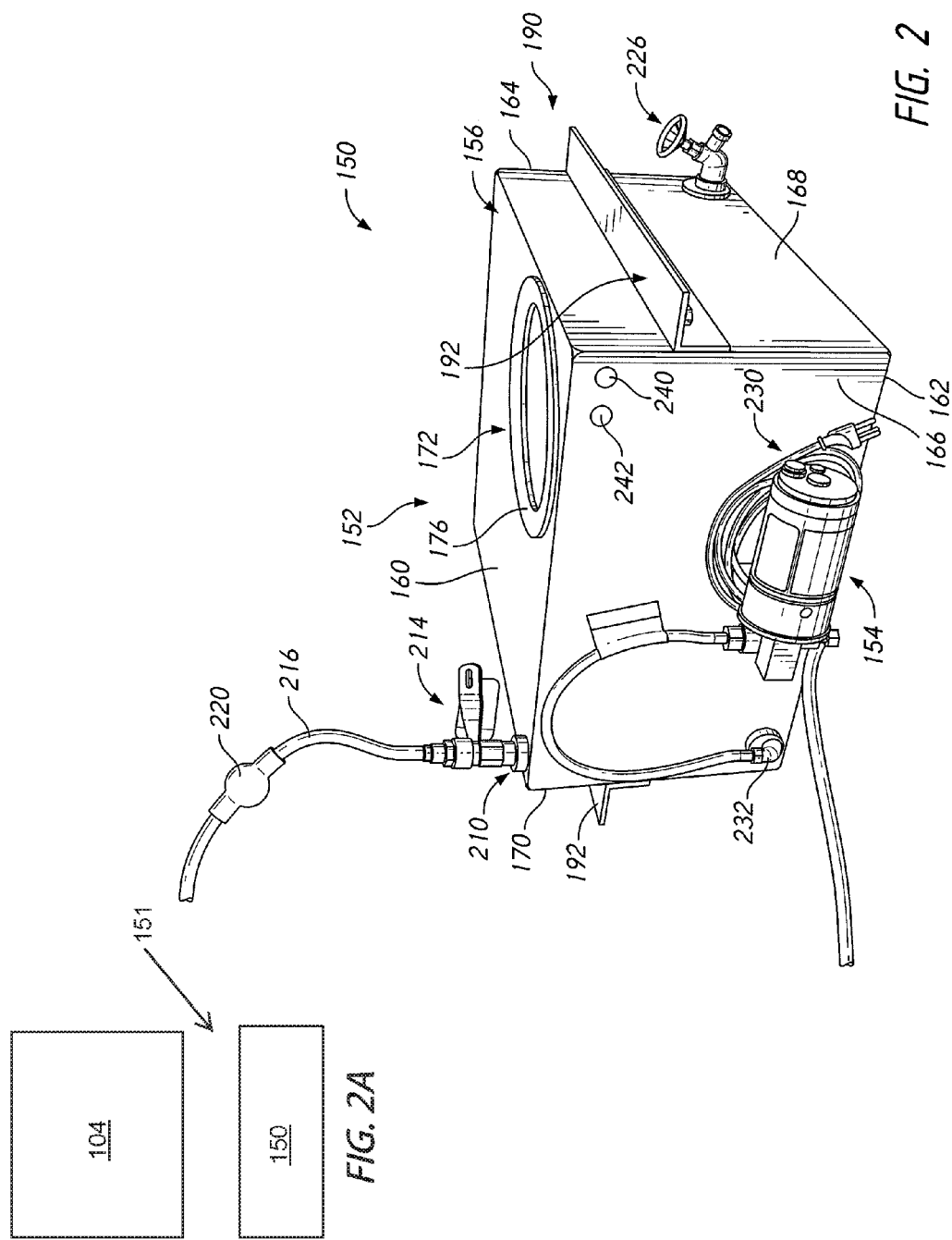
FIG. 2 is a perspective view of an auxiliary device that can be used with the commercial warewashing station of FIG. 1.
Figure 3:
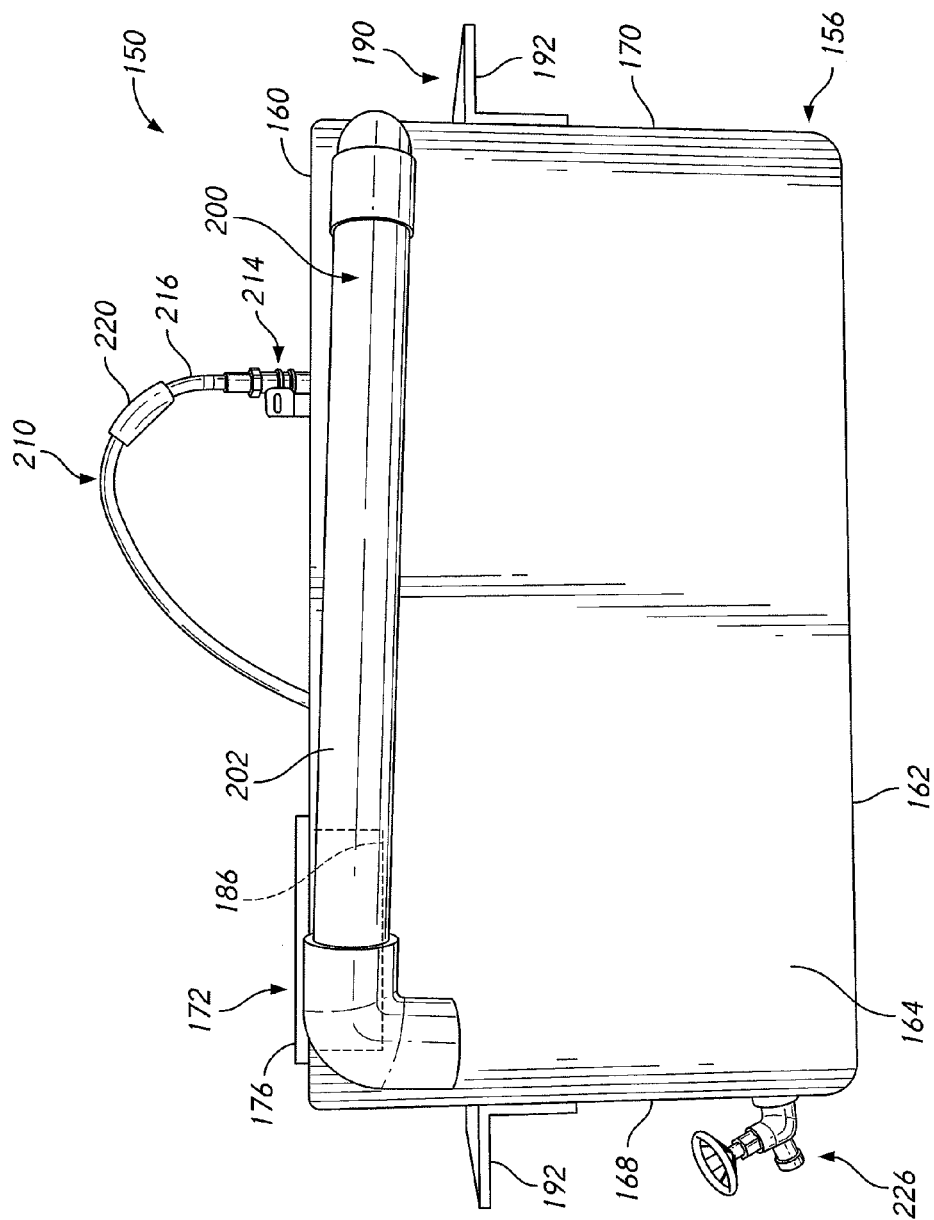
FIG. 3 is a rear view of the auxiliary device of FIG. 2.
Figure 5:
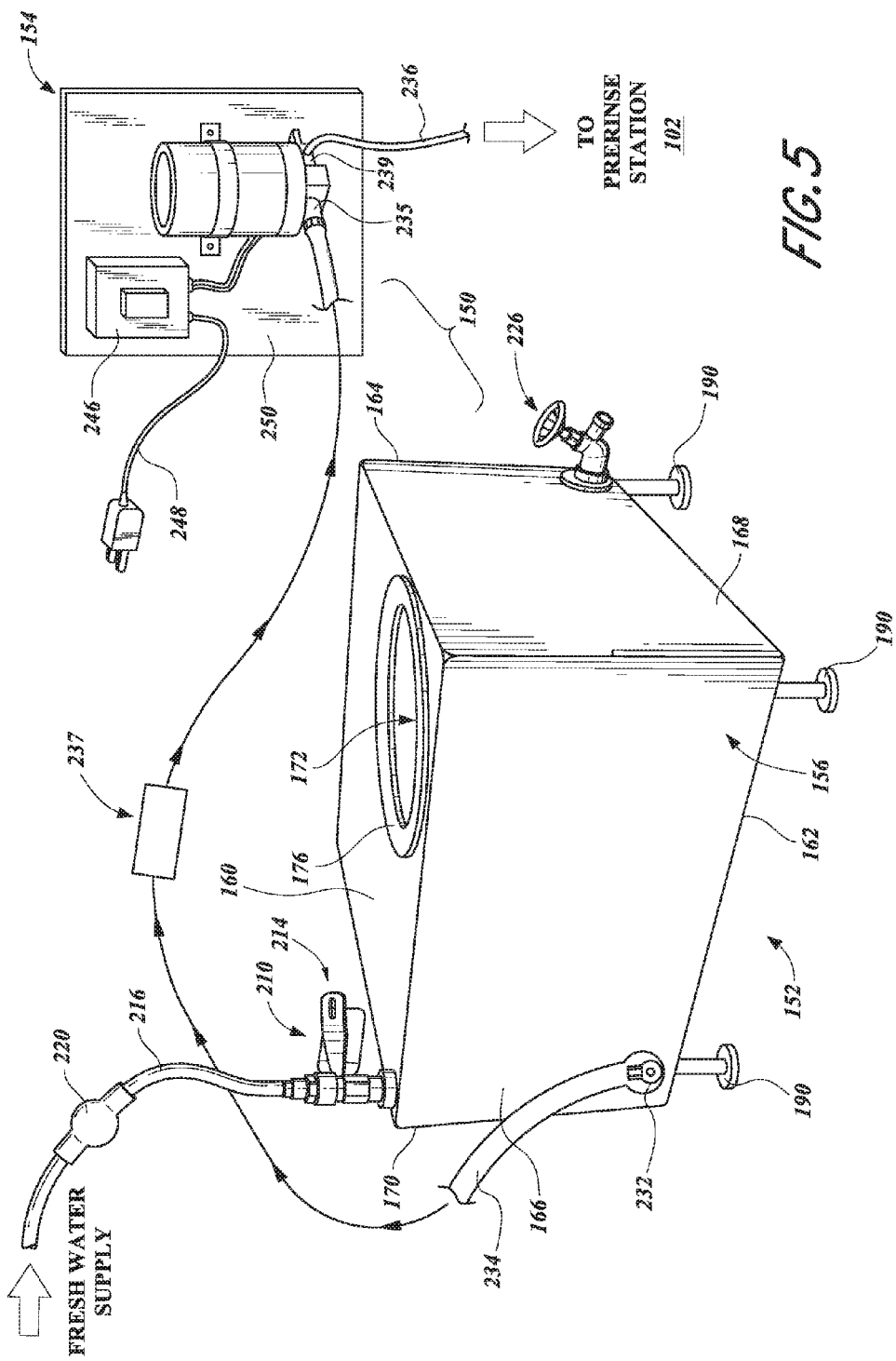
FIG. 5 is a perspective view of the auxiliary device of FIG. 2 with a holding portion and a transfer portion separated from each other.

An auxiliary device 150 that is arranged and configured in accordance with certain features, aspects and advantages of the present invention is shown in FIGS. 2, 3 and 5. The auxiliary device 150 captures the gray water being emitted from the warewashing machine 104. The auxiliary device 150 can supply the captured gray water to the pre-rinse station 102. The grey water captured by the auxiliary device 150 has been sanitized, softened and soaped during the wash cycle of the warewashing machine 104.

Advantageously, the auxiliary device 150 is separate of the warewashing machine 104 and is not permanently connected to the warewashing machine 104. While the illustrated configuration is separate of the warewashing machine 104 and not permanently connected to the warewashing machine 104, it is possible to integrate the auxiliary device 150 or at least some components of the auxiliary device 150 into a warewashing machine 104 to provide an improved warewashing machine 104. More advantageously, the auxiliary device 150 is adapted to be fluidly connected to the warewashing machine 104 through an air gap 151. For example, an air gap 151 can be disposed between the water outlet of the warewashing machine 104 and the inlet into the auxiliary device 150. In some configurations, the air gap 151 is defined between the outlet 134 and the inlet into the auxiliary device 150 with no physical components interposed there between. In some configurations, including the illustrated configuration, the air gap 151 can be defined between the drain outlet 140 (or the outlet end of a conduit connected to the drain outlet 140) and the inlet into the auxiliary device 150 with no physical components interposed there between. In other words, the air gap 151 preferably is positioned between the outlet and the inlet. The air gap 151 can be more than about 2 times the effective inner diameter of the outlet pipe of the warewashing machine 104. In some configurations, the air gap 151 can be between 2 and 3 times the effective inner diameter of the outlet pipe of the warewashing machine 104.

Broadly speaking, the auxiliary device 150 can include a holding portion 152 and transfer portion 154 that is in fluid communication with the holding portion 152. The holding portion 152 receives and collects the gray water. The transfer portion 154 conveys the grey water from the holding portion 152 to the pre-rinse station 102.

With reference now to FIG. 2, the holding portion 152 of the auxiliary device 150 generally comprises a tank 156. The tank 156 can be formed from any suitable materials keeping in mind that the tank will handle grey water that is at least about 115 degrees Fahrenheit. In some instances, the tank 156 will handle grey water that is between about 120 and 140 degrees Fahrenheit. Preferably, the tank 156 is formed of a material that can tolerate temperatures below about 190 degrees Fahrenheit (rinse water at temperatures of 194 degrees Fahrenheit and above is believed to simply cook food onto the surface of the dishes being washed).

In some configurations, the tank 156 can be formed of a material that is at least partially translucent. In some configurations, the tank 156 is formed of a material that is sufficiently translucent to provide visual confirmation of the contents of the tank 156. Moreover, the tank 156 preferably is formed of a material that admits light into the tank 156 to facilitate cleaning and drying of the tank 156 at the end of a day. The tank 156 can be formed of a material, such as polystyrene, that can provide easy formation of the tank 156. In some configurations, the tank 156 can be formed of a material that incorporates recycled materials, such as recycled plastic bottles, for example but without limitation.

Using a plastic material to form the tank 156 can provide insulating properties. In addition, the thickness of the walls can help insulate the tank 156. For example, as will be explained, a pump including a pump motor may be secured to the tank 156 and, therefore, forming the tank 156 of a plastic-based material will reduce motor vibrations and reduce or eliminate the need for an isolator or damper to be positioned between the tank 156 and the pump motor. In addition, as discussed above, the tank desirably can handle water having elevated temperatures and, therefore, being somewhat insulating is desired to help retain the heat in the grey water for use in pre-rinsing operations.

The tank 156 can have any suitable shape, size and configuration. Given a counter depth of about 24 inches, the tank preferably extends front to rear a total of less than the counter depth (i.e., 24 inches) but other dimensions are possible. In some configurations, the shape and sizing of the tank 156 is less important than the internal volume of the tank 156. For example, in some configurations, the tank 156 is designed to retain a full release of wash water from the warewashing machine 104 and the warewashing machine 104 releases about 1.4 gallons per cycle. Thus, in such configurations, the tank 156 is sized and configured to define an internal volume of at least about 1.4 gallons. Other warewashing machines can release more or less gallons per cycle (e.g., 2-3 gallons) and the size of the tank 156 can be determined based upon the application.

The outer dimensions of the tank 156 also can be determined based upon a desire to position the tank under one or more of the pre-rinse station 102, the warewashing machine 104 and the air-drying table 106. For instance, in applications in which the tank 156 will be positioned directly below the warewashing machine 104, the vertical height can be selected based upon the required height when the width and depth of the tank 156 are specified to fit within the frame 132 of the warewashing machine 104. Similarly, in applications in which the tank 156 will be positioned under the air-drying table 106, the width of the tank may be greater than the width when the tank 156 is designed to be placed below the warewashing machine 104 due to the difference in the configuration of the frame 142 of the air-drying table 106 relative to the frame 132 of the warewashing machine 104. As such, the height of the tank 156 may be reduced in such applications. In some configurations, the height of the tank is less than about 8 inches. In some configurations, the tank height is determined based upon the application. For example, the tank can have a height that is short enough to fit under a support bar of the warewashing machine 104 or the like.

The illustrated tank 156 comprises a top 160, a bottom 162, and at least one sidewall that extends generally between the top 160 and the bottom 162. In the illustrated configuration, the tank 156 includes a front wall 164, an opposing rear wall 166, a left wall 168 and an opposing right wall 170. To facilitate cleaning, the internal junctures of two or more walls, especially the junctures of the side walls 164, 166, 168, 170 with the bottom 162, are radiused to reduce the occurrence of tight corners that can be difficult to clean and/or dry.

With reference still to FIG. 2, a fine scrap trap 172 can be assembled to the tank 156. In some configurations, the fine scrap trap 172 defines a basket. As described above, the tank 156 captures water from the warewashing machine 104. While the warewashing machine 104 may include a scrap trap (e.g., scrap trap 136) of its own, the fine scrap trap 172 can be interposed between the drain outlet 140 of the warewashing machine 104 such that the grey water has already been filtered once or can be interposed between the outlet 134 of the warewashing machine 104 such that the fine scrap trap 172 performs as a primary scrap trap for the system. Because of the difference in the ultimate treatment of the grey water (i.e., from the drain outlet 140, the water goes to the city sewer system; from the tank 156, the water goes to the pre-rinse station 102), the fine scrap trap 172 advantageously is configured to limit or eliminate the infiltration of finer particles (e.g., tomato skins, rice, etc.) that could clog the pre-rinse station 102. In some applications, the fine scrap trap 172 incorporates a mesh (e.g., a stainless steel mesh). In some applications, the mesh has sufficiently small openings such that almost no rice can pass through the mesh intact.

In the illustrated configuration, the tank 156 includes an opening 174. The opening 174 can have any suitable size and configuration. In the illustrated configuration, the opening 174 is sized to be more than two times the inner effective diameter of the drain outlet 140 of the warewashing machine 140. The opening receives the fine scrap trap 172. To facilitate capture of the grey water, the opening 174 can be in the top surface 160 of the tank 156. In some configurations, the opening can be encircled by a splash curb or the like (e.g., an upwardly extending protrusion); the splash curb can contain and control splashing of water that may be caused by the velocity of the water emitted from the drain outlet 140 or the outlet 134 when the water hits the fine scrap trap 172.

The fine scrap trap 172 can be sized and configured to cooperate with the opening 174 in the tank 156. In some configurations, the opening 174 can be configured such that the fine scrap trap 172 can be formed as a tray. Forming the fine scrap trap 172 as a tray that slides generally transverse to the direction of water flow (e.g., providing a fine scrap trap drawer) can improve access to the fine scrap trap 172; providing a scrap trap 172 that inserts from the top, however, simplifies construction and reduces a need to seal around the fine scrap trap 172. In some configurations, the fine scrap trap 172 can be configured to directly underlie an existing scrap trap tray of the warewashing machine 104. Such a configuration provides for enhanced filtration while providing a more compact construction. In some configurations, the gray water from the warewashing machine can be carried to the tank 156 and/or the fine scrap trap 172 with conduit that is connected to the warewashing machine with a quick disconnect coupling. The conduit can be pivotally connected to the scrap trap of the warewashing machine, for example but without limitation. Thus, the conduit can be pivoted up and access to the fine scrap trap can be improved. In addition, complete removal of the conduit also can improve access to the auxiliary unit for cleaning and the like.

In the illustrated configuration, the fine scrap trap 172 is sized and configured for insertion into a cavity defined by the tank 156 through the opening 174 in the top 160. The illustrated fine scrap trap 172 is generally cylindrical. The fine scrap trap 172 can comprise an upper flange 176 that extends laterally outward from a side wall 180 of the fine scrap trap 172. The upper flange 176 can support the fine scrap trap 172 when it has been inserted into the opening 174 in the tank 156. The side wall 180 can comprise one or more support members 182 that can define a general shape for the side wall 180. A fine mesh or other suitable material 184 can be used form the balance of the side wall 180. A similar construction also can be used to form a bottom 186 of the fine scrap trap 172.

The illustrated fine scrap trap 172 is sized and configured to be recessed into the tank with the bottom 186 of the fine scrap trap 172 being vertically lower than the top 160 of the tank 156. In some configurations, the bottom 186 of the fine scrap trap 172 can be positioned vertically higher than a high-water level of the tank (which can be controlled by an overflow outlet, as will be discussed). By recessing the bottom 186 (or other surface that may cause splashing when contacted by the water emitted from the warewashing machine 104), splashing can be at least partially contained. Splashing of water out of the tank 156 is desired to be minimized or eliminated because such splashing of water will required clean-up at the end of operations and, in many installations, the warewashing machine 104 will be in the way during clean-up, which causes clean-up to be more difficult.

In some configurations, the fine scrap trap 172 can incorporate one or more splash reduction features. For example, but without limitation, the fine scrap trap 172 can include a cone or other flow spreading device positioned within the fine scrap trap 172 or forming at least a portion of the fine scrap trap 172. In some configurations, the bottom 186 of the fine scrap trap 172 can be conical downward or frustoconical downward. The feature can be formed of mesh or can be a solid flow diffusing component. The splash reduction feature or features can help slow the rush of water toward the bottom of the fine scrap trap, which can reduce the splashing experienced when the water contacts the bottom of the fine scrap trap 172.

With reference again to FIGS. 2 and 3, the illustrated auxiliary device 150 can include support features 190. In the illustrated configuration, the support features 190 can include rails 192 that are mounted to the tank 156. The rails 192 can be mounted to, or formed as a part of, two or more of the front, rear, left and right walls 164, 166, 168, 170. The rails 192 can be used to fit to existing structures of the warewashing machine 104 (e.g., parts of the frame 132) or to existing structures of the air-drying table 106. Thus, such a configuration provides for a compact mounting arrangement.

In some configurations, however, casters, leveling feet (see FIG. 5), a support superstructure or the like can be provided to support the tank and can define support features 190. For example, leveling feet can be provided under or alongside of the tank 156. The leveling feet would allow for the leveling of the tank to reduce the likelihood of extreme floor pitches causing issues with water level maintenance while still allowing for portability of the auxiliary device 150 when empty for purposes of cleaning the auxiliary device 150 and the surrounding area. Moreover, when leveling feet or the like are used, it is possible to vary the pitch of the bottom 162 of the tank 156 such that the fluid contained within the tank 156 can be directed to one end of the tank 156 or another, as desired. For example, by positioning a drain in a lower portion of the tank, it is possible to empty the tank 156 more completely for cleaning.

Furthermore, raising the bottom 162 of the tank 156 above the surface of the floor improves the ability to clean beneath the tank 156. In some configurations, the bottom 162 of the tank 156 is raised to be at least 2 inches above the floor. In some configurations, the bottom 162 of the tank 156 is raised to be at least 6 inches above the floor. Other heights also are possible.

With reference to FIG. 3, a water level control assembly 200 is shown. The water level control assembly 200 can define an overflow outlet for the tank 156. The tank 156 can include an outlet aperture 204 (see FIG. 4), the bottom of which can correlate to the highest desired water level. In the illustrated configuration, outlet conduit 202 can be mounted to the outlet aperture 204 to direct any overflow through the outlet conduit 202 to a suitable drain location (e.g., a drain in a floor sink or a floor drain). The illustrated configuration advantageously obviates any need for a pump, any sensors or other mechanical components to maintain the water level below a predetermined level. The outlet conduit 202 preferably terminates at least 1 inch from the top of any floor sink or floor drain; such a location can reduce splashing while providing sufficient clearance to clean the floor or floor sink. Other configurations are possible.

In the illustrated configuration, the outlet aperture 204 can extend through at least one of the sidewalls (e.g., the front, rear, left and right walls 164, 166, 168, 170) to the outlet conduit 202. In some configurations, the bottom 186 of the fine scrap trap 172 can define a generally horizontal plane that generally intersects or is positioned vertically higher than the outlet aperture 204. In some less desired configurations, the bottom 186 of the fine scrap trap 172 can define a generally horizontal plane that is vertically lower than any portion of the outlet aperture, but such configurations allow the contents of the fine scrap trap 172 to float when the water level is at the high water level defined by the water level control assembly 200.

With reference again to FIG. 2, the auxiliary device 150 can include a fresh water supply assembly 210. The fresh water supply assembly 210 can be configured to allow the addition of fresh water to the tank 156 as needed or desired. For example, at the start of each work day, the tank 156 will not have a supply of grey water for use by the pre-rinse station 102 and the fresh water supply assembly 210 can be used to provide an initial priming of the system for the first load of dishes of the day. In some configurations, about two inches of water is used for the initial priming. In some configurations, sufficient water is provided to fully cover an outlet that leads to a pump. Moreover, when pre-rinsing overly soiled dishes, it may be necessary to use more than the volume of grey water supplied by the warewashing machine 104; in such instances, the fresh water supply assembly 210 can provide makeup water.

Figure 4:
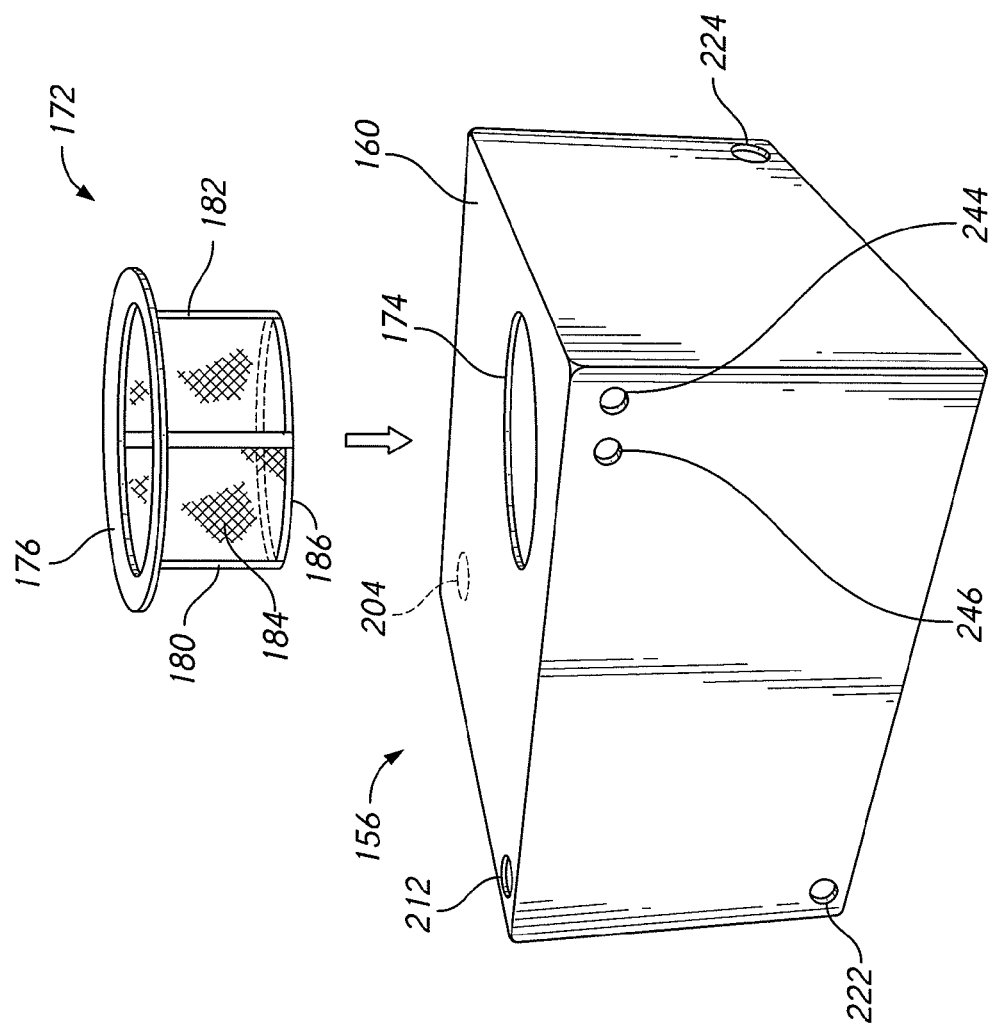
FIG. 4 is a perspective view of a tank and a fine scrap trap of the auxiliary device of FIG. 2.

The fresh water supply assembly 210 can be in fluid communication with the cavity of the tank 156 through a fresh water supply opening 212 (see FIG. 4). In some configurations, the opening 212 is positioned vertically higher than the overflow aperture 204. In some configurations, the opening 212 is positioned vertically higher than the overflow aperture by at least 2 times the diameter of the opening 212 and/or 2 times an inner diameter of any flow path connected to the opening 212. In the illustrated configuration, the opening 212 is positioned along the top 160 of the tank 156. In any event, given the relative vertical positioning of the opening 212 and the overflow aperture 204, the water level in the tank 156 is unlikely to allow grey water to flow upwardly into the fresh water supply through the fresh water supply assembly 210.

In the illustrated configuration, the fresh water supply assembly 210 can include a control valve 214 that can be manually manipulated to control the flow of fresh water through a supply conduit 216 into the tank 156. In some configurations, a backflow prevention device 220 can be integrated into or coupled with the supply conduit 216. The backflow prevention device 220 can have any suitable configuration and can help to further reduce the risk of any contamination by the grey water.

With reference to FIG. 4, a first outlet 222 from the tank 156 is illustrated. The outlet 222 advantageously is positioned generally vertically below the fresh water supply assembly 210, which increases the likelihood of rapid availability of water under low water conditions. Other locations also are possible. Moreover, the location of the fresh water supply assembly 210 can be varied depending upon the construction and layout of the warewashing station 100. In other words, it is helpful to have easy access to the control valve 214 and, for at least this reason, the location of the fresh water supply assembly 210 may vary depending upon the application.

With reference still to FIG. 4, the tank 156 also includes a second outlet 224. One or both of the first and second outlets 222, 224 can extend through the bottom 162 of the tank 156 or one or more of the sides (e.g., front, rear, right and left walls 164, 166, 168, 170). Desirably, the first and second outlets 222, 224 are sufficiently low relative to an inner bottom of the tank 156. As will be described, the first outlet 222 is fluidly connected to a supply pump while the second outlet 224 is fluidly connected to a drain valve. Thus, the first outlet 222 benefits from a low position because it increases the available water for use and the second outlet 224 benefits from a low position because it helps to more fully drain the tank 156 at the end of operations.

In some configurations, the inner bottom surface of the tank 156 is generally planar but, in some configurations, the inner bottom surface of the tank 156 can include features to help direct flow to one or both of the first and second outlets 222, 224. For example, in some configurations, a triangle, a pyramid, a cone or the like can be positioned to cause the water to move toward the sides of the tank 156. In one configuration, the inner bottom surface slopes gently toward the second outlet 224 throughout the bottom of the tank 156 because the second outlet 224, which can define an evacuation outlet, is used to substantially fully drain the tank 156 while the first outlet 222 supplies a pump and, therefore, should be fully or substantially submerged during operations and, if not, the fresh water supply assembly 210 can be used to augment the water supply within the tank 156.

With reference to FIG. 2, a spigot 226 can be connected to the tank 156 at the second outlet opening 224. The spigot 226 can be used at the end of operations to drain the grey water from the tank. Accordingly, the sizing of the spigot 226 can be determined, at least in part, by the desired flow rate for emptying the tank 156 at the end of operations. In some configurations, a hose can be used to direct the flow to a floor drain or a floor sink. In some configurations, a bucket can be used to transfer the remnants from the tank 156 via the spigot 226. Other suitable configurations also can be used.

A pump 230 can be supported by the auxiliary device 150 or can be mounted separate of the auxiliary device 150. The pump 230 in the configuration illustrated in FIG. 2 is mounted to the tank 156. More particularly, in the configuration illustrated in FIG. 2, the pump 230 is mounted to one of the side walls of the tank 156. The pump 230 can be secured using four fasteners, which allows for rapid replacement and exchange if desired. In some configurations, the pump 230 can be mounted to the top 160 of the tank 156. By mounting the pump to the top of the tank 156, the pump 230 and any electrical connections can be positioned above any anticipated water level.

The pump 230 can have any suitable configuration. In one configuration, the pump 230 can provide a maximum flow rate of about two gallons per minute and a pressure of 60 psi. In one configuration, the pump is a FLOJET model number D3835B5011A. The pump 230 preferably is configured to run only on demand. In other words, the pump 230 does not run unless the pre-rinse unit 114 is being used. Other pumps and other configurations can be used. The illustrated configuration is advantageously simple in construction in that no floats or other components are used to indicate or ameliorate a low water condition; rather, the pump 230 simply ingests air with the water and sputtering at the pre-rinse unit 114 will indicate a need for additional water.

A fitting 232 can be used to join a supply conduit 234 to the first outlet 222. In other words, a first end of the supply conduit 234 can be connected to the first outlet 222 with the fitting 232. A second end of the supply conduit 234 can be connected to by another fitting 235 to an inlet of the pump 230. One or both of the fittings 232, 235 can be formed of brass, stainless steel or plastic. In some configurations, one or more of the fittings 232, 235 can be formed as a quick-connect type of fitting. In some configurations, a screen or other filter can be disposed at the inlet of the supply conduit 234, at the outlet of the supply conduit 234 or both. The supply conduit 234 can be a braided conduit or can have any other suitable configuration.

In some configurations, a filter 237 can be positioned at a location between the first outlet 222 of the tank 156 and the inlet of the pump 230. In some configurations, the filter 237 can be positioned along the supply conduit 234. The filter 237 can be any suitable filter. In some configurations, the filter 237 is an in-line flow through filter. The filter can filter remnants of food products that remain even after the scrap traps discussed above. For example, in restaurants serving bean-based food items, the beans can be reduced to a paste-like consistency, which may not be captured by either of the scrap traps. Thus, the filter 237 can optionally be installed between the tank 156 and the pump 230, as schematically illustrated in FIG. 5.

An outlet of the pump 230 can be connected to the inlet 126 of the pre-rinse unit 114. In some configurations, a fitting 239 can be used to connect the delivery conduit 236 to the pump 230. The fitting 239 can be formed of brass, stainless steel or plastic. In some configurations, the fitting 239 can be formed as a quick-connect type of fitting. In some configurations, a delivery conduit 236 extends from the outlet of the pump 230 to the inlet 126 of the pre-rinse unit 114. The delivery conduit 236 can include a first length that extends to a tee fitting and two lengths that connect the tee fitting to the portions of the pre-rinse unit 114 that otherwise would connect to the hot water faucet 122 and the cold water faucet 124 respectively. By connecting to both portions of the pre-rinse unit 114, it is possible for the pump 230 to pressurize the line. In some configurations, the delivery conduit 236 may connect to only one of the portions of the pre-rinse unit 114 while the other portion can be plugged to reduce or eliminate the likelihood of the grey water contaminating a fresh water supply and to reduce the eliminate the likelihood that the pump 230 cannot pressurize the delivery conduit 236.

The tank 156 can be provided with water condition sensing components if desired. For example, in the illustrated configuration, a water temperature sensor 240 can be provided. The water temperature can be sensed in any suitable manner. In some configurations, the water temperature can be sensed using a thermometer. In addition, in some configurations, a water PH sensor 242 can be provided. The water PH sensor also can have any suitable configuration. In some configurations, the tank 156 can be provided with a port to include a PH tester, which could possibly be a dipper rod that enters the tank 156 through the top 160. Water PH often will be monitored in conjunction with warewashing machines. Typically, water PH is sensed using test strips in the food service industry. The water PH sensor 242 can be an electric PH sensor or the like and can be used to provide an indication of the water PH without the need for repeated testing of PH using the expensive PH test strips. In some configurations, one or more of the temperature and PH can be simply indicated in a go-no go style while, in other configurations, relative values can be provided. For example, a PH of less than 13 is desired and can be indicated by a first color indicator while a PH exceeding that value can be indicated by a second color indicator. In some configurations, a PH of less than 10 is achieved. The PH can be monitored for many reasons, including monitoring for levels that can shorten the life of certain components of the auxiliary device 150. Ports 244, 266 for the sensors can be provided through one or more walls of the tank 156. Any suitable placement and number of ports can be provided.

The pump 230 can be connected to a switch 246 (see FIG. 5). The switch 246 can have any suitable configuration. In some configurations, the switch 246 can be water tight or suitable rated for water use. The switch 246 can be used to supply power to and remove power from the pump 230. As such, a power supply cord 248 can be connected to the switch 246. Any suitable power supply cord 248 can be used and any suitable power supply can be provided to the pump 230.

In the configuration of FIG. 5, a mounting panel 250 can be used to support one or more of the components that define the transfer portion 154. The mounting panel 250 can be formed of any suitable material. In some configurations, the mounting panel 250 is formed from starboard, plastic, stainless steel or the like. In some configurations, the mounting panel 250 is formed of a water-resistant material. In some configurations, the mounting panel 250 can be an enclosure or housing or the like. In some configurations, the mounting panel 250 is white.

In the illustrated configuration, the mounting panel 250 supports the pump 230. In the illustrated configuration, the mounting panel 250 supports the switch 246. Other components also can be supported by the mounting panel 250 (e.g., the filter 237). Through the use of disconnects (for the fluid components and/or the electrical components), the mounting panel 250 provides an easily replaced component in the event of pump or switch failure, for example but without limitation. In addition, the mounting panel facilitates mounting the electrical components at a location that is suitable. Further, by mounting the pump 230 to the mounting panel, the pump 230 is moved upward to a location that removes it from the foot region such that kitchen workers are less likely to make inadvertent contact with the pump 230.

In some configurations, the transfer portion 154 and the holding portion 152

Method of Installation

As discussed above, certain features, aspects and advantages of the present invention relate to the auxiliary device 150 being arranged and configured for installation without significant modification to the warewashing machine 104. As used herein, "without significant modification" means that the changes are easily reversible (e.g., reversing the changes does not require the use of a welder). For example, simply removing a scrap trap is easily reversible and simply redirecting a conduit through plumbing is easily reversible. On the other hand, a modification that requires a welding device, a saw, a grinder or the like is not easily reversible.

As such, one method of installation provides a simple connection. The inlet 126 to the pre-rinse unit 114 can be disconnected from the hot and cold water faucets 122, 124. The auxiliary device 150 can be moved into position proximate the warewashing station 100. In configurations having a mounting board, the mounting board can be secured to a desired location (e.g., a wall or other supporting structure). Any connections discussed above (e.g., those with quick-connect fittings) can be made. The auxiliary device 150 can be located such that the drain outlet 140 from the warewashing machine 104 empties into the inlet into the tank 156 (e.g., empties into the fine scrap trap 172) or the auxiliary device 150 can be located such that the outlet 134 empties into the inlet into the tank 156. In some techniques, a delivery conduit can be provided to transport the flow from the outlet 156 to the inlet and into the tank 156.

The inlet 126 of the pre-rinse unit 114 can be connected to the delivery conduit 236. The fresh water supply assembly 210 can be connected to a source of water, such as one or both of the hot and cold water faucets 122, 124. In some configurations, because the pre-rinse unit 114 is disconnected from the public water supply, any low-flow nozzle can be removed and a high-flow (or normal flow) nozzle can be installed in the place of the low-flow nozzle. The outlet conduit 202 of the overflow outlet 200 can be positioned over a floor sink or floor drain. The pump 230 can be connected to an electrical supply. With these very few connections made, the tank 156 can be primed using the fresh water supply assembly 210 and then operations can commence using the grey water captured from the warewashing machine 104 beginning with the second cycle.

At the end of operations (e.g., the end of the work day), the contents of the tank 156 can be drained through the pre-rinse unit 114 and/or the spigot 226. Once drained, the auxiliary device 150 can be moved out from beneath the warewashing station 100 to allow cleaning beneath that warewashing station 100. In addition, the fine scrap trap 172 can be removed from the opening 174. The opening 174 advantageously can be sized and configured to allow an operator to reach inside of the tank 156 to dry and clean the inside of the tank 156. Moreover, the opening 174 can be configured to allow visual confirmation that the tank 156 has been cleaned and dried.

In use, the auxiliary device 150 can save water as well as gas and/or electricity. First, by capturing the grey water from the commercial warewashing machine, the auxiliary device 150 significantly decreases the amount of water used in the warewashing process. In addition, because fresh water is not being used by the pre-rinse station, the fresh water need not be heated, which saves gas and/or electricity that would be used to heat the fresh water supply. Because the grey water has a sufficiently elevated temperature for pre-rinsing, the grey water does not require further heating. The savings for a commercial food service facility can easily exceed $55,000 per year.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:
1. A warewashing system comprising:
a commercial warewashing machine;
an auxiliary grey water supply device comprising a tank, an inlet, an outlet, and an overflow aperture, the overflow aperture being vertically higher than the outlet, the auxiliary grey water supply device positioned under at least a portion of the commercial warewashing machine such that substantially all of a load of grey water that is evacuated from a bottom outlet of the commercial warewashing machine flows into the inlet of the tank through an air gap disposed between the bottom outlet of the commercial warewashing machine and the inlet of the tank;

a pump having an inlet and an outlet, the inlet of the pump in fluid communication with the outlet of the tank;

a prerinse unit positioned above a sink, the prerinse unit laterally spaced apart from the commercial warewashing machine and from the auxiliary grey water supply device; and a delivery conduit having a first end and a second end, the first end in fluid communication with the pump outlet, the second end in fluid communication with the prerinse unit.

2. The system of claim 1, wherein the inlet of the tank receives a removable scrap trap.

3. The system of claim 1, wherein at least a portion of the tank is translucent whereby light is admitted into the tank through one or more walls of the tank.

4. The system of claim 3, wherein the tank is formed of a translucent plastic material.

5. The system of claim 2, wherein the removable scrap trap comprises a bottom surface, the bottom surface being vertically lower than an upper inner wall of the tank when the removable scrap trap is positioned within the inlet.

6. The system of claim 5, wherein the removable scrap trap comprises a mesh basket.

7. The system of claim 6, wherein the mesh basket comprises a mesh that stops substantially all intact rice from passing through the mesh basket.

8. The system of claim 5, wherein the bottom surface of the removable scrap trap is vertically higher than a lowermost portion of the overflow outlet such that a maximum water level defined by the overflow outlet is vertically lower than the bottom surface of the removable scrap trap.

9. The system of claim 1, wherein the tank further comprises an evacuation outlet, the evacuation outlet being disposed along a lower portion of the tank.

10. The system of claim 9, wherein the evacuation outlet is in fluid communication with a spigot whereby flow through the evacuation outlet can be controlled with the spigot.

11. The system of claim 1, further comprising at least one supporting member that supports the tank.

12. The system of claim 11, wherein the supporting member is a rail that is adapted to be supported under a component of the commercial warewashing machine.

13. The system of claim 1, wherein the tank further comprises a fresh water supply assembly in fluid communication with a cavity defined by the tank.

14. The system of claim 13, wherein the fresh water supply assembly comprises a valve whereby a supply of fresh water can be manually provided to the tank.

15. The system of claim 1, wherein the tank further comprises a temperature sensor that is adapted to sense a temperature of contents of the tank.

16. The system of claim 1, wherein the tank further comprises a PH sensor that is adapted to sense a PH of contents of the tank.

17. The system of claim 1, wherein the auxiliary grey water supply device is separate from the warewashing machine and is not permanently connected to the warewashing machine.

18. The system of claim 1, wherein no physical components are interposed between the bottom outlet of the warewashing machine and the inlet of the tank.

19. The system of claim 1, wherein the air gap comprises a distance of at least two times the effective inner diameter of the bottom outlet of the warewashing machine.

* * * * *

UNITED STATES PATENT AND TRADEMARK OFFICE
CERTIFICATE OF CORRECTION

PATENT NO. : 9,596,973 B2  Page 1 of 1
APPLICATION NO. : 14/493808
DATED : March 21, 2017
INVENTOR(S) : Lee et al.

It is certified that error appears in the above-identified patent and that said Letters Patent is hereby corrected as shown below:

On the Title Page

Item (72), Inventors at Line 2, change "Dickinson," to --Dickenson,--.

Signed and Sealed this
Twentieth Day of June, 2017

Joseph Matal
*Performing the Functions and Duties of the
Under Secretary of Commerce for Intellectual Property and
Director of the United States Patent and Trademark Office*